United States Patent
Lee

(10) Patent No.: US 11,667,242 B2
(45) Date of Patent: Jun. 6, 2023

(54) INCLINED TYPE SWING STEP AND TRUCK THEREOF

(71) Applicants: HYUNDAI MOTOR COMPANY, Seoul (KR); KIA CORPORATION, Seoul (KR)

(72) Inventor: Myung-Kyu Lee, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 75 days.

(21) Appl. No.: 17/340,375

(22) Filed: Jun. 7, 2021

(65) Prior Publication Data
US 2022/0144174 A1    May 12, 2022

(30) Foreign Application Priority Data
Nov. 11, 2020 (KR) .......................... 10-2000-0150154

(51) Int. Cl.
*B60R 3/02* (2006.01)
(52) U.S. Cl.
CPC ..................... *B60R 3/02* (2013.01)
(58) Field of Classification Search
CPC .................................................... B60R 3/02
See application file for complete search history.

(56) References Cited

U.S. PATENT DOCUMENTS

| | | | | |
|---|---|---|---|---|
| 2,702,195 A | * | 2/1955 | Marcellus | B60R 3/02 182/89 |
| 4,053,172 A | * | 10/1977 | McClure | B60R 3/02 182/89 |
| 4,333,547 A | * | 6/1982 | Johansson | E06C 7/08 182/196 |
| 5,284,349 A | * | 2/1994 | Bruns | B60R 3/02 280/166 |
| 2009/0001682 A1 | * | 1/2009 | Yamashita | B60R 3/02 280/163 |
| 2016/0152188 A1 | | 6/2016 | Handschke et al. | |
| 2016/0339843 A1 | * | 11/2016 | Rinaldi | B60R 3/02 |
| 2018/0044884 A1 | * | 2/2018 | Tsutsumi | B60R 3/02 |
| 2018/0126912 A1 | * | 5/2018 | Tanaka | E02F 9/16 |

* cited by examiner

*Primary Examiner* — Bryan A Evans
(74) *Attorney, Agent, or Firm* — McDonnell Boehnen Hulbert & Berghoff LLP

(57) ABSTRACT

An inclined type swing step attached to a truck includes a step bracket mounted on a lower region of a cabin providing a driver's seat, a step for a foothold, and a step swing device composed of a hinge shaft spring and/or a press shaft spring, positioning the step inside a virtual approach angle line formed with respect to a ground from a front side of a wheel through one-side inclination in a state where the step is spaced apart from the step bracket, and generating spring elasticity acting to make the step return to an initial position after downward movement of the step. The inclined type swing step can hold shaking of the step due to driver's stepping, improve vehicle accessibility through prevention of an interference by the step, and absorb an external object impact exceeding an approach angle.

17 Claims, 15 Drawing Sheets

INCLINED TYPE SWING STEP AND TRUCK THEREOF

CROSS REFERENCE TO RELATED APPLICATIONS

This application claims priority to Korean Patent Application No. 10-2020-0150154, filed on Nov. 11, 2020, which is incorporated herein by reference in its entirety.

BACKGROUND

Field

Exemplary embodiments of the present disclosure relate to a swing step of a truck, and particularly, to a truck applied with an inclined type swing step which has an unwavering stepping fixing force during driver's stepping and is positioned inside an approach angle line through a selective rotation against the step.

Description of the Related Art

In general, a truck is provided with a step of a multi-level structure on a garnish region surrounding an upper side of a tire from the bottom of a door, and the step enables a driver and a passenger to easily get on a cabin formed high from the ground.

As an example, the step may be classified as a fixed step and a swing step. In this case, the fixed step has a simple structure in which a plurality of steps (i.e., footholds) are fixed on the garnish region, and is applied to dump and general trucks. In contrast, the swing step adopts a rotatable step plate supported by a hinge/spring structure, and thus has an advantage of being strong against an external impact as compared with the fixed step.

The fixed step has a simple structure, but is vulnerable to contaminations by flying tire products and damages by external impacts.

In particular, since the step (i.e., foothold) that is a stepping surface in the step structure is positioned outside the approach angle line of the truck, the fixed step is also vulnerable to the impact caused by external projections and the like. Here, the approach angle line is an imaginary line that becomes the basis of rough road driving of the truck with respect to an inclined road or a bound, and forms an inclined angle formed to be connected from a ground contact part of a front wheel tire to the front of a truck that is spaced apart from the ground.

Further, according to the fixed step, it can be structurally difficult to position the step (i.e., foothold) that is the stepping surface inside the approach angle due to the driver's liftability and lowest ground clearance regulations (e.g., 600 mm from the ground).

Further, since the swing step does not have a fixing structure with respect to the step (i.e., foothold) that is the stepping surface, there may be a risk of injury when the driver uses the swing step.

Further, according to the swing step, since the step (i.e., foothold) is supported by applying a spring thereto together with a hinge, it may be difficult to absorb an external impact in spite of the excellent stepping fixing force in case of the strong spring strength, whereas it can only be difficult to select a proper spring strength since shaking occurs due to a lack of spring strength during the driver's stepping in spite of the excellent external impact absorption in case of the weak spring strength.

SUMMARY

Exemplary embodiments of the present disclosure overcome the above disadvantages and other disadvantages not described above, and provide an inclined type swing step and a truck thereof, which can facilitate driver's stepping by preventing the shaking of a step with a strong fixing force by a swing structure using a spring and a hinge. The step of the present disclosure can improve vehicle accessibility through prevention of an interference by the step during driving on a bound and an inclined road, and can absorb an external object impact exceeding an approach angle by positioning the step inside a virtual approach angle line formed with respect to the ground from a front side of a wheel as a layout in one-side inclined state.

Other objects and advantages of the present disclosure can be understood by the following description, and become apparent with reference to the embodiments of the present disclosure. Also, it is obvious to those skilled in the art to which the present disclosure pertains that the objects and advantages of the present disclosure can be realized by the means as claimed and combinations thereof.

In accordance with the present disclosure to achieve the above object, a swing step includes a swing supporter connected to a step bracket positioned above a step that forms a foothold, and a swing arm connecting the swing supporter and the step to each other so that the step is inclined to one-side inclination in a state where the step is spaced apart from the step bracket.

In one embodiment, the swing supporter is composed of a first swing supporter combined with a hinge guide formed on one side of the step bracket, and a second swing supporter combined with a hinge guide formed on the other side of the step bracket, and the swing arm is composed of a first swing arm connected to the first swing supporter and a second swing arm connected to the second swing supporter, and the first swing arm forms the one-side inclination so that the step is inclined by lifting up the step higher than the second swing arm.

In one embodiment, the first swing supporter includes a hinge shaft connected to the first swing arm as a center of rotation, and a first stopper bush and a second stopper bush are provided on both sides of a shaft part of the hinge shaft in a state where the hinge shaft is positioned on the hinge guide, and the first stopper bush and the second stopper bush form the one-side inclination on the step by limiting rotation of the hinge shaft within a limited rotating angle region.

In one embodiment, each of the first stopper bush and the second stopper bush forms the limited rotating angle region in a "D" cross-sectional shape that contacts an inner wall surface of the hinge guide.

In one embodiment, the first swing supporter further includes a hinge shaft spring generating spring elasticity through rotation of the first swing arm when the hinge shaft spring surrounds the hinge shaft, a press shaft coming contacting the first stopper bush and the second stopper bush, and moving downward together with the hinge shaft, and a press shaft spring generating spring elasticity through compression by downward movement of the press shaft.

In one embodiment, the spring elasticity of the hinge shaft spring is generated by a torsion spring, and the spring elasticity makes an initial state of the step inclined to the one-side inclination.

In one embodiment, the spring elasticity of the press shaft spring is generated by a compression spring, and the spring elasticity pushes the press shaft upward and makes the hinge shaft return to an initial position.

In one embodiment, the second swing supporter is composed of a hinge shaft connected to the second swing arm to form a center of rotation when the hinge shaft is positioned on the hinge guide, a first rotating bush and a second rotating bush provided on both sides of a shaft part of the hinge shaft, a press shaft contacting the first rotating bush and the second rotating bush, and moving downward together with the hinge shaft, and a press shaft spring generating spring elasticity through compression by downward movement of the press shaft.

In one embodiment, each of the first rotating bush and the second rotation is in an "O" cross-sectional shape, and is rotated in an inner space of the hinge guide.

In one embodiment, the spring elasticity of the press shaft spring is generated by a compression spring, and the spring elasticity pushes the press shaft upward to return the hinge shaft to an initial position.

In one embodiment, each of the first swing arm and the second swing arm makes a driver's stepping space of the step and the step bracket in an inverse trapezoid shape in a state where the step comes downward.

In one embodiment, the step is connected to the first swing arm through a first hinge boss formed on one side, and is connected to the second swing arm through a second hinge boss formed on the other side, and the first hinge boss and the first swing arm, and the second hinge boss and the second swing arm are respectively connected to each other through hinge pins.

In one embodiment, the hinge guide forms a space in which the first swing supporter and the second swing supporter move upward and downward, and is formed at a square corner of the step bracket.

In accordance with the present disclosure to achieve the above object, a truck includes an inclined type swing step composed of a step bracket, a step spaced apart from the step bracket and forming a driver's stepping space, a swing supporter connected to the step bracket, and a swing arm connecting the swing supporter and the step to each other so that the step is inclined to one-side inclination in a state where the step is spaced apart from the step bracket, and a cabin providing a driver's seat and forming a lower region on which the step bracket is mounted so that the step is positioned inside a virtual approach angle line formed with respect to a ground from a front side of a wheel to the one-side inclination.

In one embodiment, the step bracket is composed of a mounting bracket provided with a hinge guide with which the swing supporter is hinge-combined and a fixed flange fastened to the lower region of the cabin, and a side cover bracket combined with the mounting bracket and covering the hinge guide, and the hinge guide forms a space in which the swing supporter moves upward/downward so that movement of the swing arm interlocks with the upward/downward movement of the step.

In one embodiment, the lower region of the cabin is a garnish extension region surrounding an upper side of the wheel or a bumper extension region.

As described above, the inclined type swing step applied to the truck according to the present disclosure implements the following works and effects.

First, the swing step is the swing structure using the spring and the hinge, and has an advantage of the strong stepping fixing force and the possible selective rotations by situations. Second, since the step plate does not shake when a strong force is applied, the driver and the passenger can safely get on the cabin. Third, since the step absorbs the impact which is exerted by an external object and which exceeds the approach angle, it is possible to save an after-sales service cost caused by damages. Fourth, the selective rotations by situations are possible so that the step is positioned inside the approach angle. Fifth, since the step is positioned inside the approach angle during driving, interference does not occur during the driving on the bound and the inclined road, and thus the vehicle accessibility can be improved. Sixth, since the driver's stepping liftability for the swing step is satisfied, customer's productivity can be improved.

It is to be understood that both the foregoing general description and the following detailed description of the present disclosure are exemplary and explanatory and are intended to provide further explanation of the disclosure as claimed.

BRIEF DESCRIPTION OF THE FIGURES

The above and other objects, features and other advantages of the present disclosure will be more clearly understood from the following detailed description taken in conjunction with the accompanying drawings, in which.

DETAILED DESCRIPTION

Hereinafter, embodiments of the present disclosure will be described in detail with reference to the accompanying drawings. Such embodiments are exemplary and those of ordinary skill in the art to which the present disclosure pertains will be able to implement the embodiments in various different forms. Accordingly, the present disclosure is not limited to the embodiments as described herein.

Figure 1:
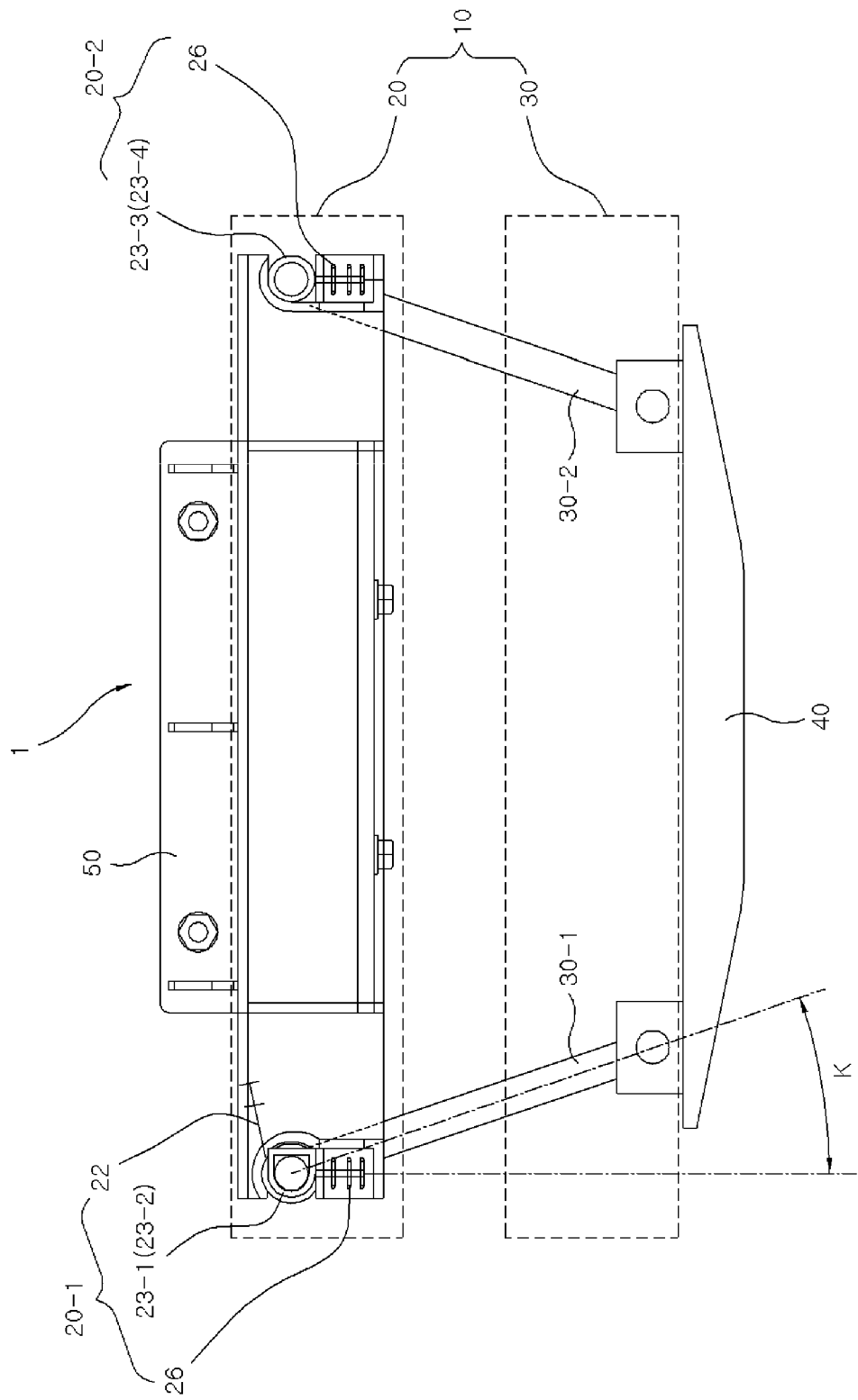
FIG. 1 is a perspective view of an inclined type swing step according to the present disclosure.

Referring to FIG. 1, a swing step 1 includes a step swing device 10, a step 40, and a step bracket 50.

In particular, the step swing device 10 is composed of a swing supporter 20 including a pair of first and second swing supporters 20-1 and 20-2, and a swing arm 30 including a pair of first and second swing arms 30-1 and 30-2.

Further, between the first and second swing supporters 20-1 and 20-2, the first swing supporter 20-1 absorbs/mitigates an external impact exerted on the step 40 by spring elasticity of a hinge shaft spring 22. First and second stopper bushes 23-1 and 23-2 make the step 40 in a one-side inclination state by restraining the rotation of the first swing arm 30-1 as a limited rotation angle region against the rotation of a hinge shaft 21, and the step 40 maintains the one-side inclination state as an initial position by lifting the first swing arm 30-1 upward by spring elasticity of a press shaft spring 26.

In contrast, the second swing supporter 20-2 causes the second swing arm 30-2 to interlock with rotation movement of the first swing arm 30-1 by the rotation of first and second rotating bushes 23-3 and 23-4, and causes the second swing arm 30-2 to interlock with upward movement of the second swing arm 30-2 by the spring elasticity of the press shaft spring 26.

Further, since the first swing arm 30-1 is unfolded so that the first swing arm 30-1 has an equal inclination angle K to an inclination angle K of the second swing arm 30-2 when the first and second swing arms 30-1 and 30-2 are spaced apart from each other, an interval between the step 40 and the step bracket 50 is widened when the step 40 goes downward, and thus a space is provided for a driver to step on the step 40.

That is, each of the first swing arm 30-1 and the second swing arm 30-2 makes the driver's stepping space between the step 40 and the step bracket 50 in an inverse trapezoid shape when the step 40 goes downward.

Figure 9:
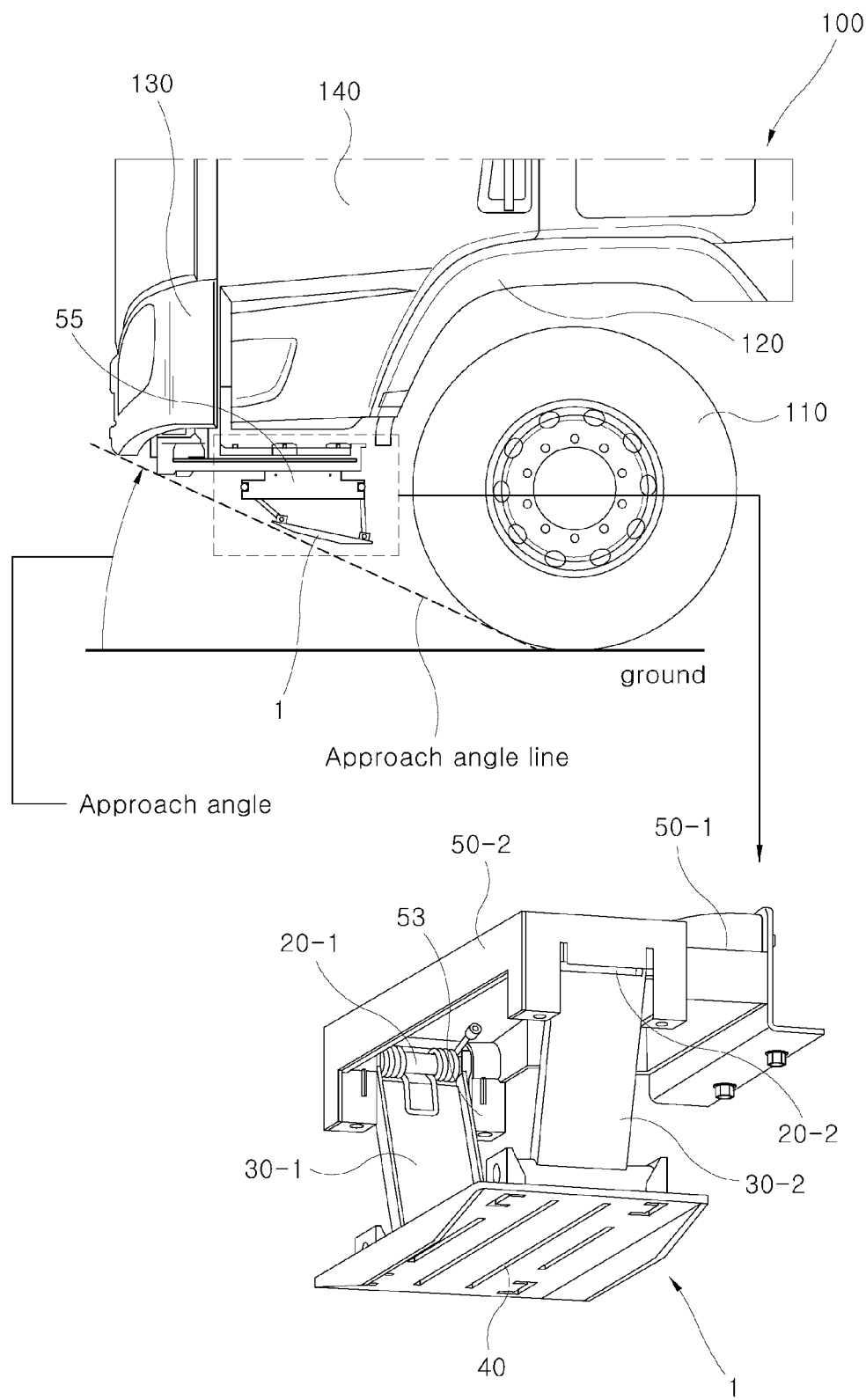
FIG. 9 illustrates an example of a truck to which an inclined type swing step according to the present disclosure is applied.

Further, the first swing supporter 20-1 and the first swing arm 30-1 are connected, and are positioned in front of the swing step 1(i.e., forward direction (or position on the side of a bumper 130) of a truck 100 of FIG. 9), while the second swing supporter 20-2 and the second swing arm 30-2 are connected, and are positioned in the rear of the swing step 1 (i.e., rearward direction (or position on the side of a wheel 110) of the truck 100 of FIG. 9).

Figure 2:
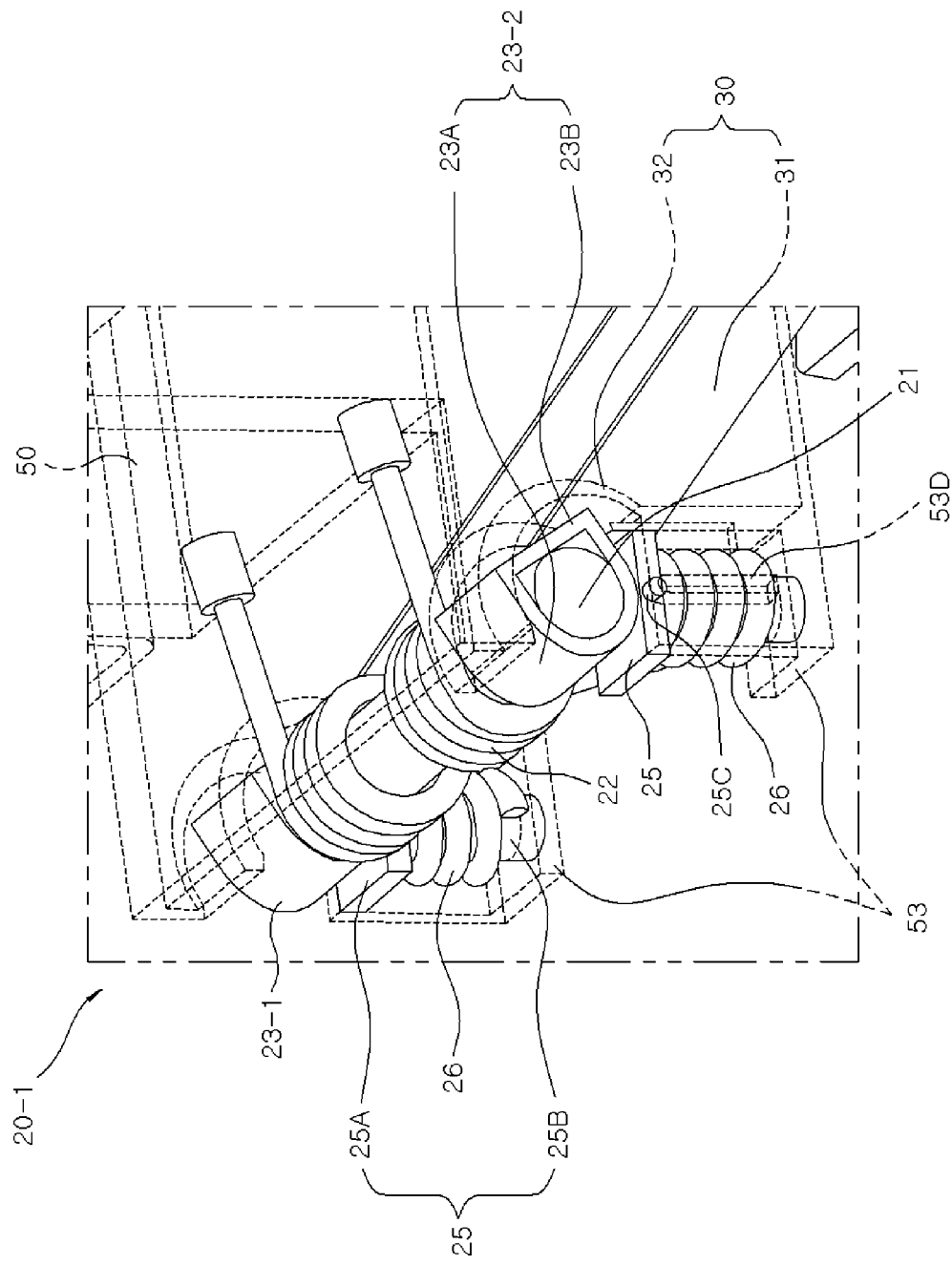
FIGS. 2, 3, and 4 are configuration diagrams of a swing supporter of a step swing device applied to an inclined type swing step according to the present disclosure.
Figure 3:
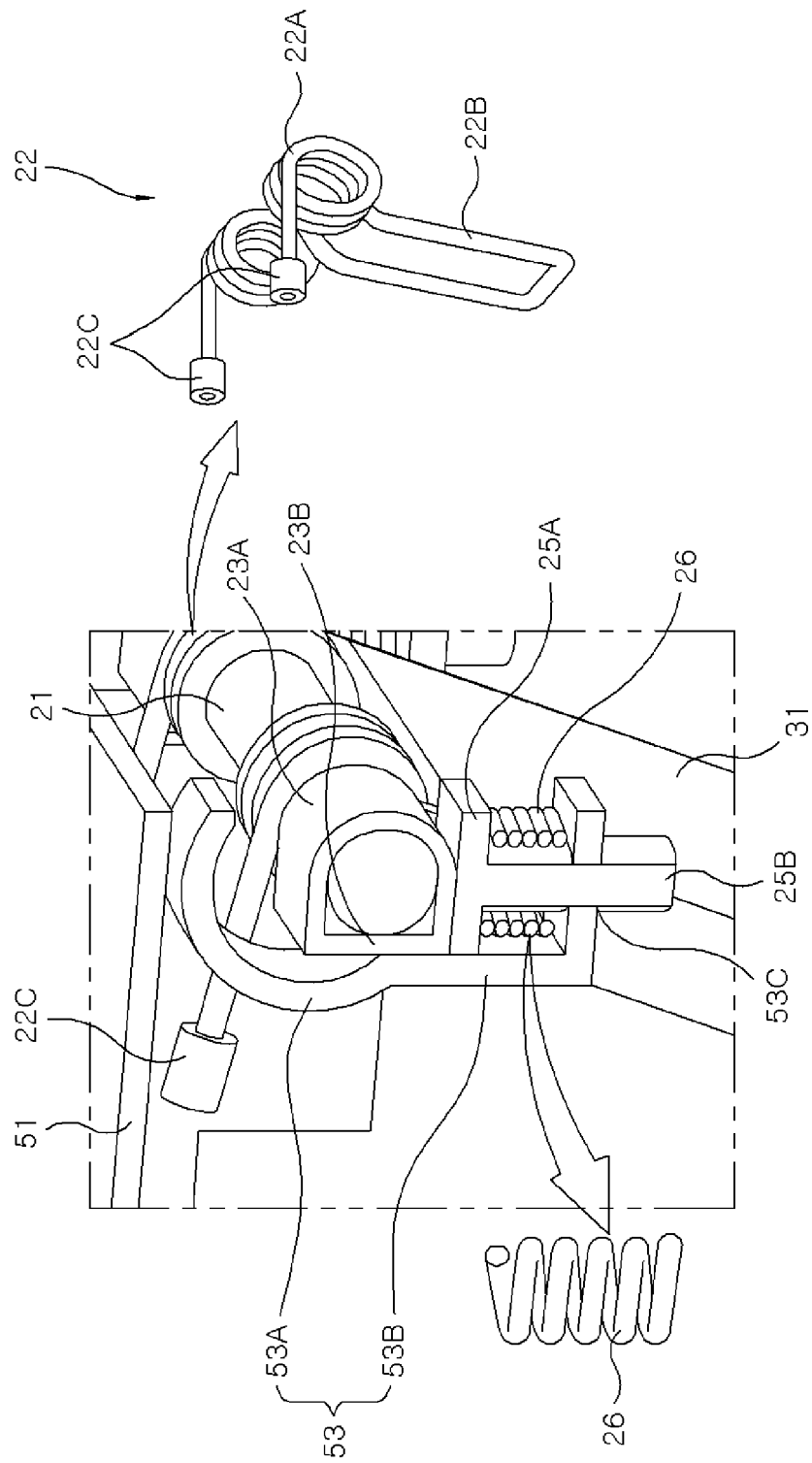
Figure 4:
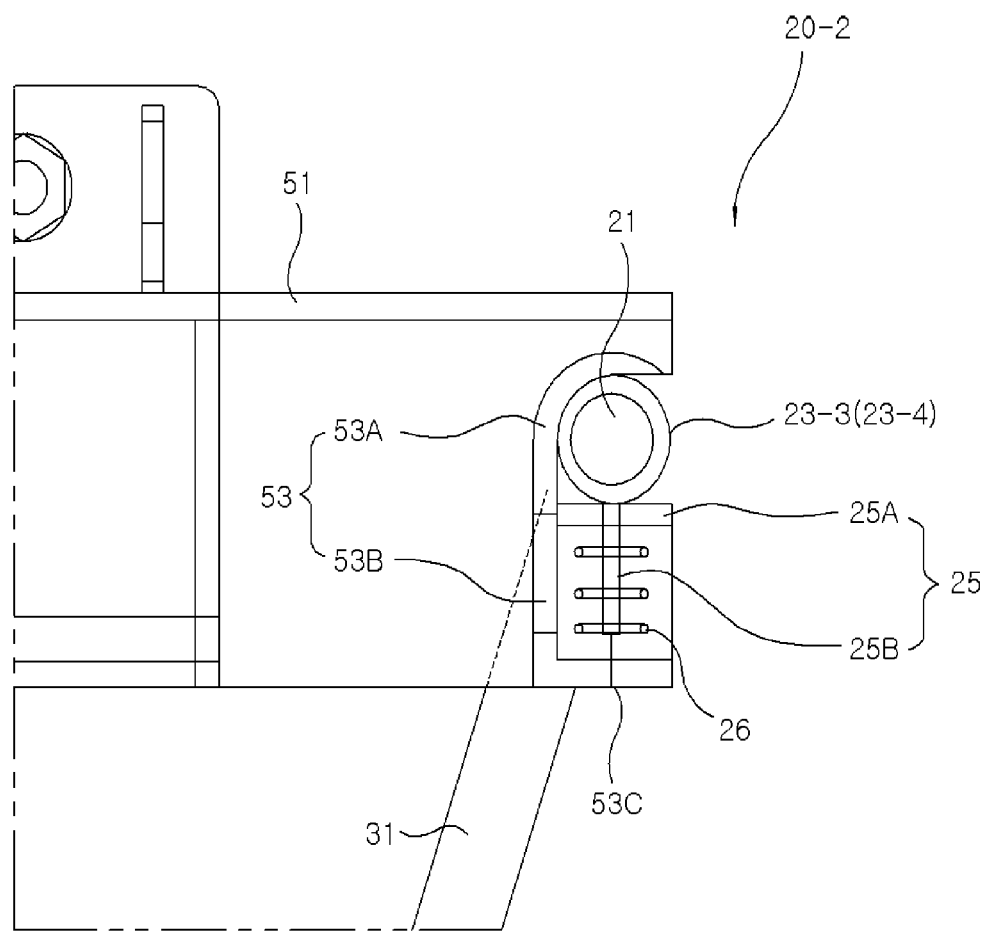

Meanwhile, FIGS. 2 to 4 illustrate the detailed configuration of a swing supporter 20 in the step swing device 10.

Referring to FIG. 2, in the swing supporter 20 having the first and second swing supporters 20-1 and 20-2, the first swing supporter 20-1 includes a hinge shaft 21, a hinge shaft spring 22, first and second stopper bushes 23-1 and 23-2, a press shaft 25, and a press shaft spring 26.

As an example, the hinge shaft 21 is in a circular rod shape, and interacts with a half boss 32 of the first swing arm 30-1 to act as a rotation center for rotation movement of the first swing arm 30-1. The hinge shaft spring 22 is wound on the hinge shaft 21, and produces spring elasticity for absorbing/mitigating an external impact applied to the step 40.

In particular, the hinge shaft 21 is spaced apart from a mounting bracket 50-1 between the mounting bracket 50-1 and a side cover bracket 50-2 (shown in FIG. 5), which are each part of step bracket 50, and is positioned on a left/right hinge guide 53 that forms an opening space for movement of the first swing arm 30-1.

As an example, the first and second stopper bushes 23-1 and 23-2 form a limited rotation angle region so that the step 40 is positioned inside an approach angle line in a one-side inclination state. In this case, the first stopper bush 23-1 is combined with one end part of the hinge shaft 21, whereas the second stopper bush 23-2 is combined with the other end part of the hinge shaft 21, and a space, in which the half boss 32 of the first swing arm 30-1 is combined with the hinge shaft 21, is formed between them.

In particular, when each of the first and second stopper bushes 23-1 and 23-2 is in an initial state through rotation of the hinge shaft 21, a rotating body 23A comes in contact with the press shaft 25 lifted up by a press shaft spring 26, but a straight surface 23B comes out of a spring deformation space part 53B of the hinge guide 53 and gets caught on a wall surface of a shaft position part 53A, and thus the first swing arm 30-1 moves counterclockwise to lift up the side of the step 40 so that the step 40 is in an inclined state.

As an example, a pair of press shafts 25 are provided to come in contact with the first stopper bush 23-1 and the second stopper bush 23-2, and are pressed downward by the rotation of the first and second stopper bushes 23-1 and 23-2 by means of the hinge shaft 21. The press shaft spring 26 is compressed when the press shaft 25 is pressed, and then lifts up the hinge shaft 21 and the first and second stopper bushes 23-1 and 23-2 by the spring elasticity to make them return to their initial states when the press is released.

In particular, the press shafts 25 are positioned on the left/right hinge guides 53 of the mounting bracket 50-1 between the mounting bracket 50-1 and the side cover bracket 50-2.

Referring to FIG. 3, the hinge shaft 21 is positioned in the shaft position part 53A of an opening semicircle shape of the hinge guide 53, and the press shaft 25 is positioned in the spring deformation space part 53B that forms an empty space in the lower part of the shaft position part 53A.

Further, each of the first and second stopper bushes 23-1 and 23-2 has a "D" cross-sectional shape formed by the rotating body 23A and the straight surface 23B, and the rotating body 23A is fitted into the hinge shaft 21 to fix the first and second stopper bushes 23-1 and 23-2 to the hinge shaft 21.

Further, through the rotation of the first and second stopper bushes 23-1 and 23-2, the straight surface 23B comes out of the shaft position part 53A of the hinge guide 53, goes downward to the spring deformation space part 53B, and forms a non-rotating state through contact with the wall surface of the spring deformation space part 53B to provide a limited rotation angle region to the first and second stopper bushes 23-1 and 23-2. In this case, the limited rotation angle region restrains the first swing arm 30-1 between the first and second swing arms 30-1 and 30-2, and thus the first swing arm 30-1 is not rotated any more.

Further, the press shaft 25 includes a press plate 25A, an extension rod 25B, and a projection pin 25C, which together form a "T" cross-sectional shape. In this case, the press plate 25A is a square plate, and each of the first and second stopper bushes 23-1 and 23-2 comes in contact with the rotating body 23A to receive a downward pressing force in accordance with the rotation angle thereof. The extension rod 25B, which includes a straight or circular rod, goes downward through a hole 53C formed on a bottom surface of the spring deformation space part 53B of the hinge guide 53, and the projection pin 25C (refer to FIG. 2) projects from the side surface of the press plate 25A and moves along a slot 53D (refer to FIG. 2) formed on the spring deformation space part 53B of the hinge guide 53.

In particular, the projection pin 25C holds the position of the press shaft 25 in an inner space of the spring deformation space part 53B, but since the position is held through combination of the extension rod 25B and the hole 53C of the spring deformation space part 53B, the projection pin 25C may be removed.

Further, the hinge shaft spring 22 is of a torsion spring type, and is composed of a winding part 22A, a bottom contact part 22B, and a top contact part 22C. In this case, the winding part 22A is divided into two portions spaced apart from each other, and the bottom contact part 22B comes out of the winding part 22A of the two portions with a predetermined length and elastically supports an arm body 31 of the first swing arm 30-1. The top contact part 22C forms a coil end part of the winding part 22A of each of the two portions, comes out with a predetermine length, and elastically supports a bracket body 51 of the mounting bracket 50-1 between the mounting bracket 50-1 and the side cover bracket 50-2 of the step bracket 50.

In some embodiments, the press shaft spring 26 may be a compression spring type.

Referring to FIG. 4, the second swing supporter 20-2 is composed of the hinge shaft 21, first and second rotating bushes 23-3 and 23-4, press shaft 25, and press shaft spring 26.

As an example, the hinge shaft 21 is in a circular rod shape, and is combined with the half boss 32 of the second swing arm 30-2 to act as a rotation center for a rotation movement of the second swing arm 30-2. The press shaft 25 is composed of the press plate 25A, extension rod 25B, and projection pin 25C. The press shaft spring 26 is a compression spring type.

Accordingly, the hinge shaft 21, the press shaft 25, and the press shaft spring 26 of the second swing supporter 20-2 are substantially the same as the hinge shaft 21, the press shaft 25, and the press shaft spring 26 of the first swing supporter 20-1 described above with reference to FIGS. 2 and 3.

However, each of the first and second rotating bushes 23-3 and 23-4 has a "O" cross-sectional shape, and the first rotating bush 23-3 is combined with one end part of the hinge shaft 21, whereas the second rotating bush 23-4 is combined with the other end part of the hinge shaft 21 to form a space in which the half boss 32 of the second swing arm 30-2 is combined with the hinge shaft 21 as a spacing interval between them.

Accordingly, the second swing supporter 20-2 is different from the first swing supporter 20-1 described with reference to FIGS. 2 and 3 in that the first and second rotating bushes 23-3 and 23-4 are in the "O" cross-sectional shape, and the hinge shaft spring 22 is not applied.

In particular, in contrast with the rotation angle limitations of the first and second stopper bushes 23-1 and 23-2 in the initial state by the rotation of the hinge shaft 21, each of the first and second rotating bushes 23-3 and 23-4 is able to be freely rotated on the hinge guide 53, and the second swing arm 30-2 has a small clockwise rotation as compared with the counterclockwise rotation angle of the first swing arm 30-1. This may causes a difference in inclination angle between the first swing arm 30-1 and the second swing arm 30-2, and thus the step 40 may be inclined.

Figure 5:
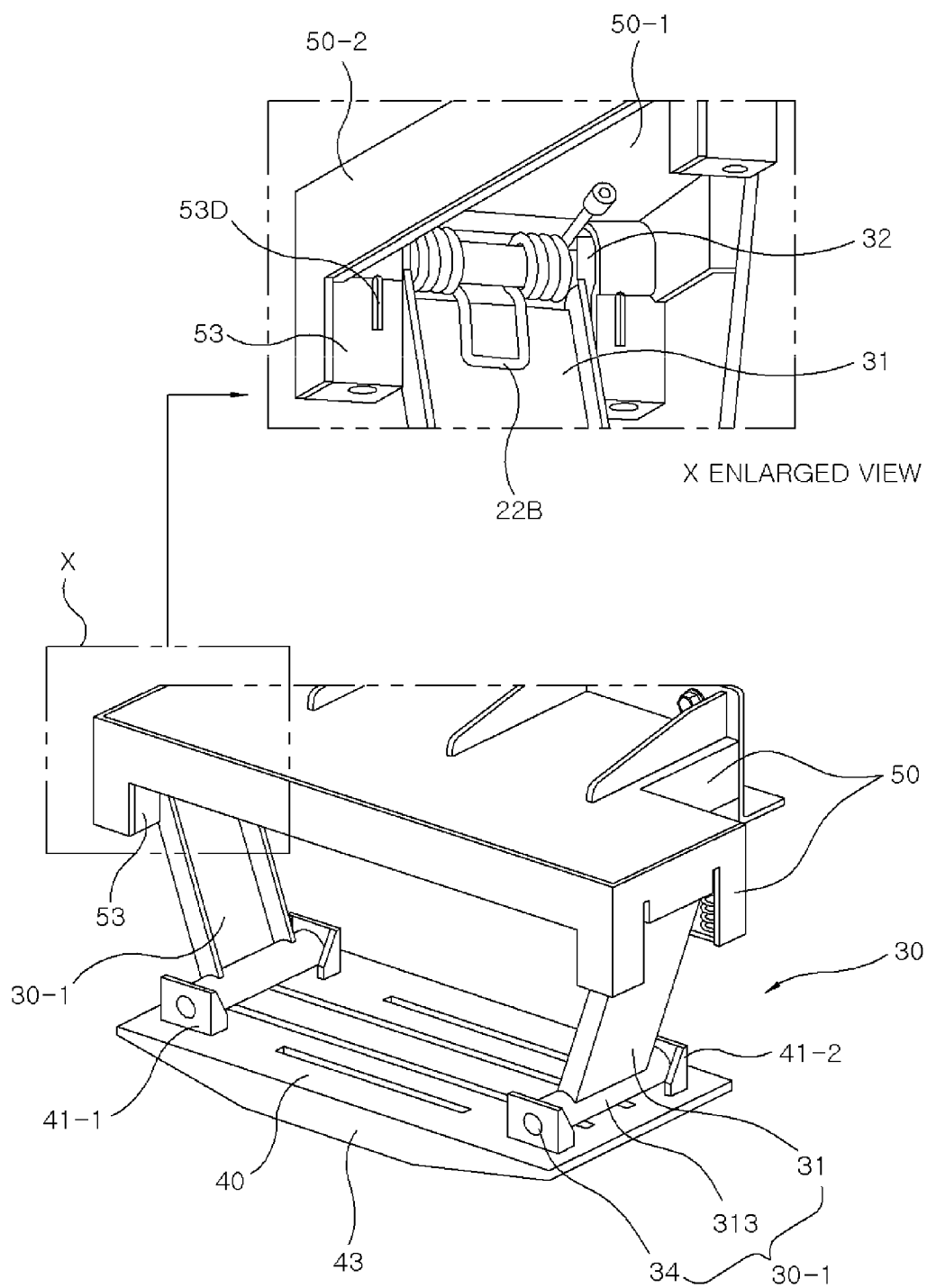
FIG. 5 is a configuration diagram of a swing arm of a step swing device according to the present disclosure.

Meanwhile, FIG. 5 is a configuration diagram of a swing arm of a step swing device according to the present disclosure.

As illustrated, the swing arm 30 is composed of a pair of a first swing arm 30-1 and a second swing arm 30-2, and each of the first swing arm 30-1 and the second swing arm 30-2 includes the same constituent elements of an arm body 31, a half boss 32, a hollow boss 33, and a hinge plate 34.

As an example, the arm body 31 is in a square frame shape having a predetermined length, and the predetermined length is a length in which the interval between the step 40 and the step bracket 50 is able to be formed as a driver's stepping space when the first swing arm 30-1 and the second swing arm 30-2 go down to be unfolded.

As an example, the half boss 32 has a one-side open shape at one end of the arm body 31, and is fitted into the hinge shaft 21 at a spacing interval formed by the first and second stopper bushes 23-1 and 23-2 and the first and second rotating bushes 23-3 and 23-4. The hollow boss 33 has a hollow cross-section at the other end of the arm body 31, and the hinge pin 34 is fitted therein. The hinge pin 34 is composed of a circular rod, and is fastened to the first hinge boss 41-1 and the second hinge boss 41-2 of the step through the hollow boss 33.

Accordingly, the first swing arm 30-1 is fitted into the hinge shaft 21 by the half boss 32 to configure the first swing supporter 20-1, is combined with the mounting bracket 50-1 of the step bracket 50, and is fitted into the first hinge boss 41-1 by the hinge pin 34 to be combined with the step 40. Further, the second swing arm 30-2 is fitted into the hinge shaft 21 by the half boss 32 to configure the second swing supporter 20-2, is combined with the mounting bracket 50-1 of the step bracket 50, and is fitted into the second hinge boss 41-2 by the hinge pin 34 to be combined with the step 40.

Figure 6:
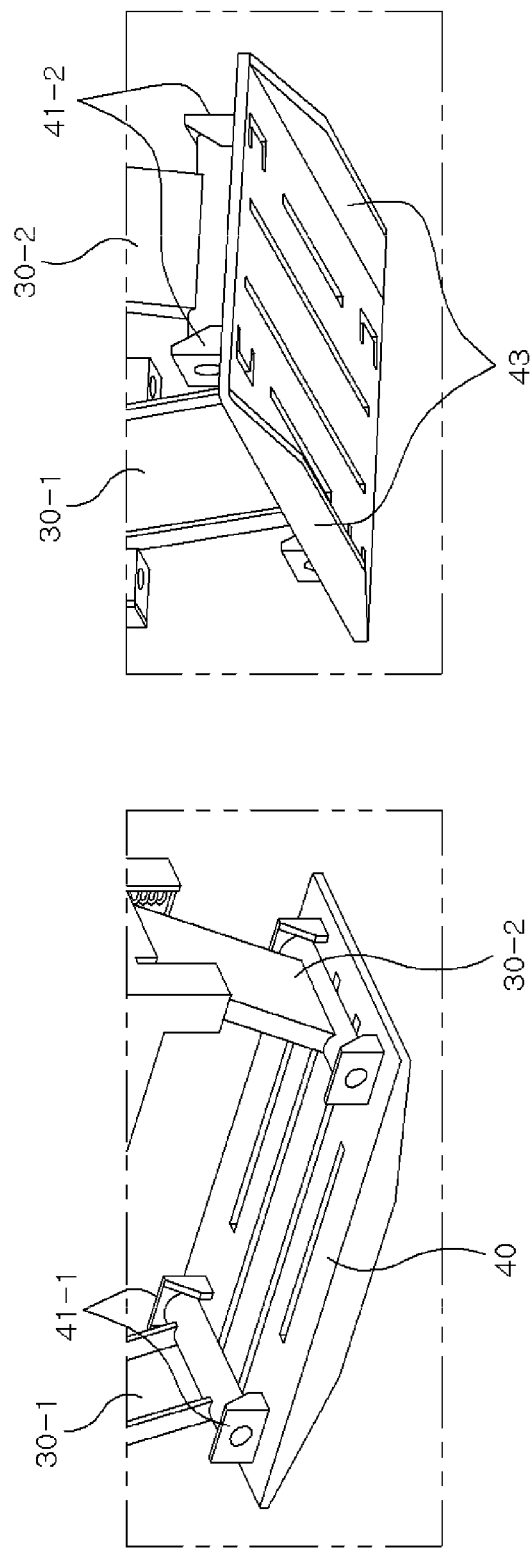
FIG. 6 is a configuration diagram of a step applied to an inclined type swing step according to the present disclosure.
Figure 7:
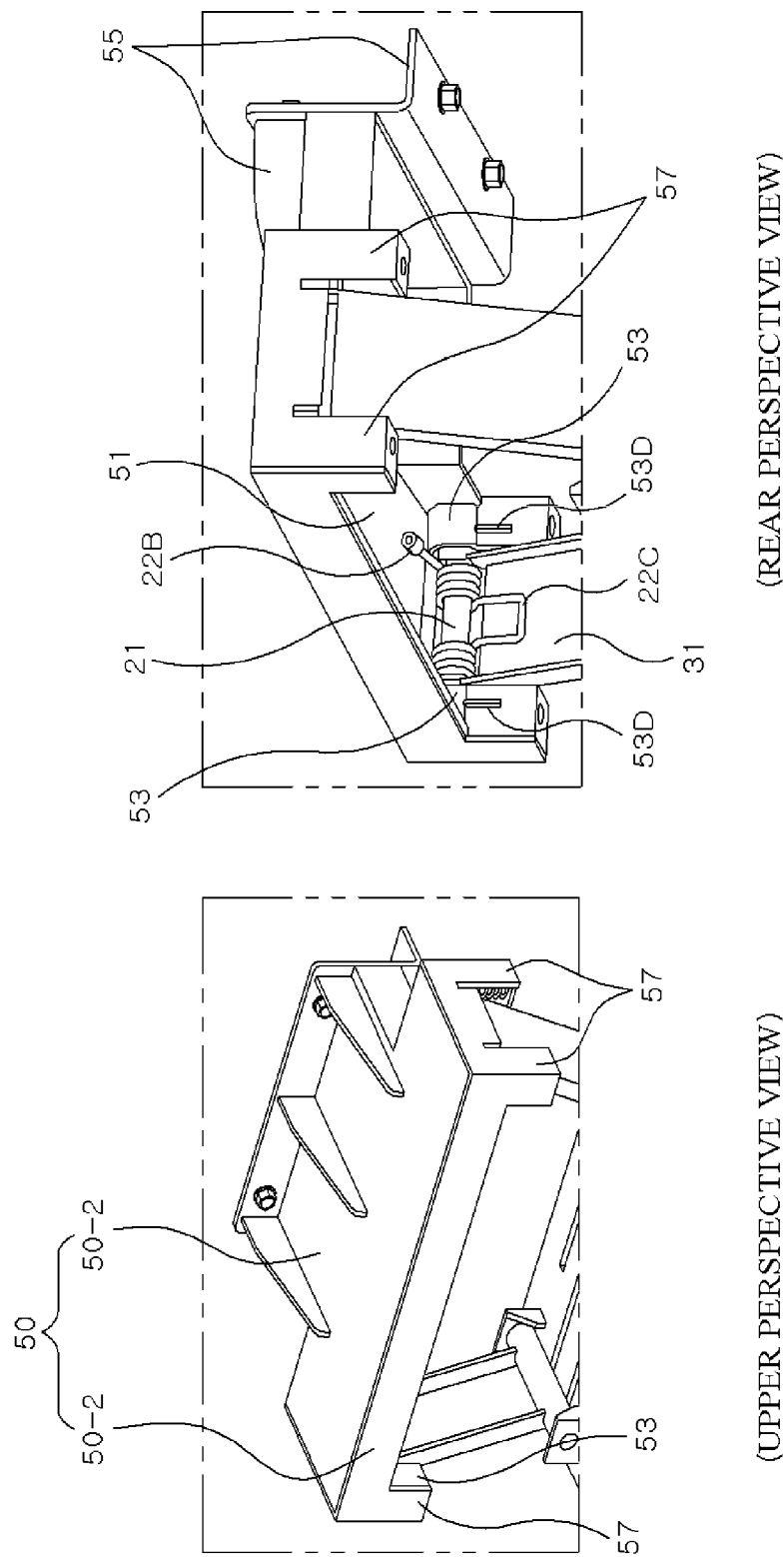
FIG. 7 is a configuration diagram of a step bracket applied to an inclined type swing step according to the present disclosure.

Meanwhile, FIGS. 6 and 7 illustrate the detailed configuration of the step 40 and the step bracket 50.

Referring to FIG. 6, the step 40 includes a square-shaped plate of a predetermine size, the first hinge boss 41-1 is formed to project from one side of the upper surface of the step 40 and the second boss 41-2 is formed to project from the other side thereof, and a side flange 43, which is bent on the upper surface of the step, is formed on the front/rear side surface among the side surfaces.

In particular, any one of a groove, a rib, and a projection is formed on the upper surface of the step 40 to prevent sliding during stepping.

Referring to FIG. 7, the step bracket 50 includes the mounting bracket 50-1 combined with the first and second swing supporter 20-1 and 20-2 using the hinge guide 53, and the side cover bracket 50-2 combined with the lower region of the mounting bracket 50-1 to cover the hinge guide 53.

As an example, the mounting bracket 50-1 includes the bracket body 51 composed of a square-shaped plate of a predetermined size, the hinge guide 53 formed at a square corner (or square edge) on the lower surface of the bracket body 51, and a fixed flange 55 projecting from one of side surfaces of the bracket body 51.

In particular, the hinge guide 53 is composed of the shaft position part 53A, the spring deformation space part 53B, the hole 53C, and the slot 53D as described above through FIGS. 2 to 5. Further, the fixed flange 55 is fastened, by bolts or by welding, to a relative part (e.g., any one part of an extension part of a garnish 120, an extension part of a bumper 130, and an extension part of a cabin 140 in a truck 100 of FIG. 9), and the swing step 1 is united to the relative part.

As an example, the side cover bracket 50-2 is composed of a square-shaped frame having square corners at which projecting cover legs 57 are formed. In this case, each of the cover legs 57 covers the open spaces of the shaft position part 53A and the spring deformation space part 53B constituting the hinge guide 53 to block the cause of contamination with respect to the first and second swing supporter 20-1 and 20-2, and thus can smoothly maintain the rotations of the first and second stopper bushes 23-1 and 23-2 and the first and second rotating bushes 23-3 and 23-4.

Figure 8:
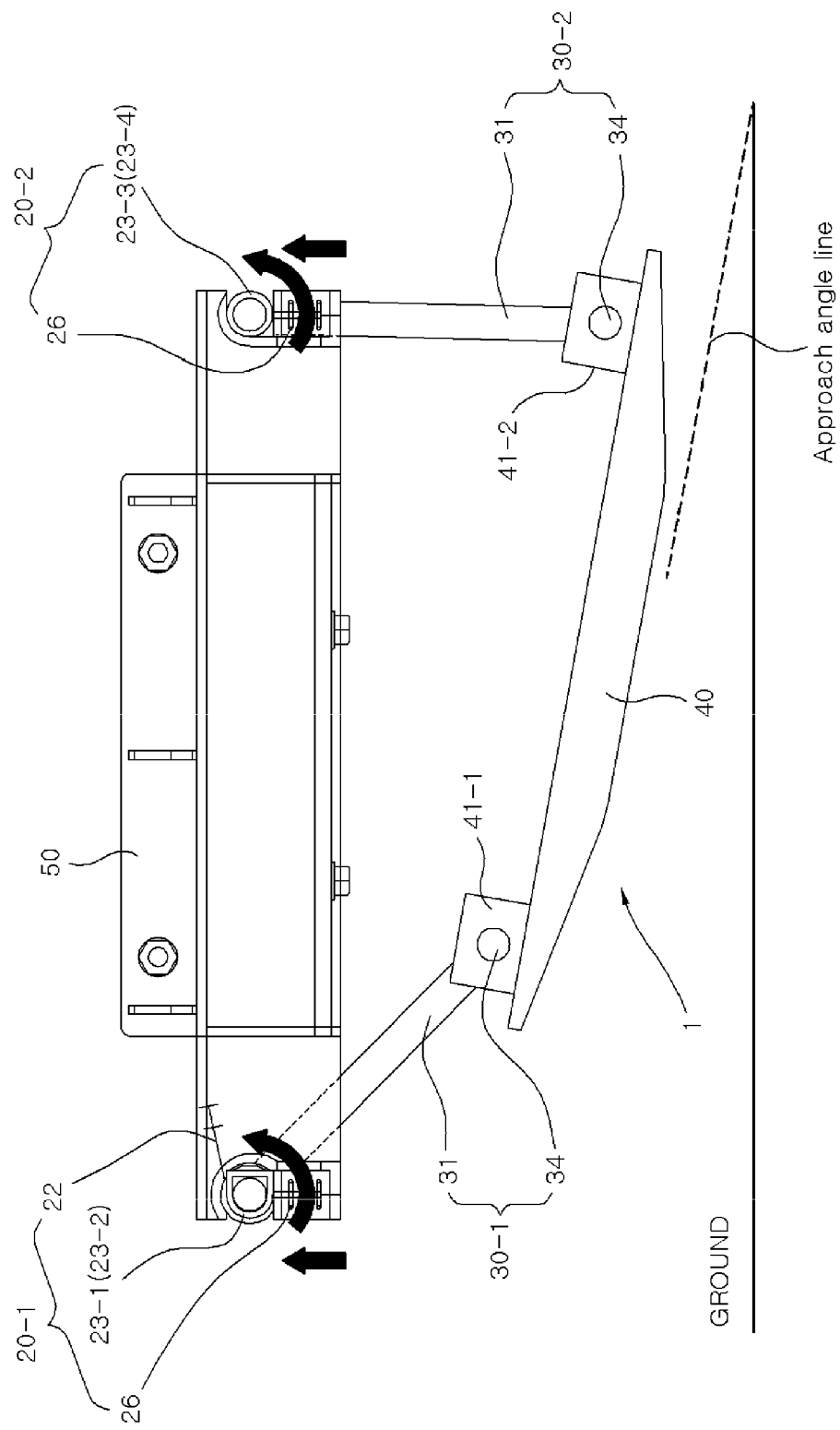
FIG. 8 illustrates an initial state in which an inclined type swing step through a step swing device according to the present disclosure is formed by a swing supporter.

Meanwhile, FIG. 8 exemplifies an initial state of the swing step 1.

As illustrated, in the initial state of the step swing device 10, as described above through FIGS. 2 and 4, the inclination angle of the first swing arm 30-1 formed by the first swing supporter 20-1 becomes larger than the inclination angle of the second swing arm 30-2 formed by the second swing supporter 20-2 to cause a difference in inclination angle, and thus the region of the step 40 connected to the first swing arm 30-1 goes upward to be higher than the region of the step 40 connected to the second swing arm 30-2.

Accordingly, the step 40 forms a layout in which the step is positioned inside the approach angle line with respect to the ground in the one-side inclination state. Accordingly, the swing step 1 is the inclined type swing step, in which the step 40 capable of preventing shaking by the spring elasticity is positioned inside the approach angle line in the one-side inclination state together with a situation-specific rotation operation by the limited rotation angle region.

In particular, the inclined type swing step as described above has the following characteristics. First, since the layout of the step 40 can prevent the occurrence of the interference caused by the step 40 during the driving on the bound and the inclined road, vehicle accessibility can be improved. Additionally, since the damage of the step 40 can be prevented against the impact which is exerted by an external object and which exceeds the approach angle, it is possible to save an after-sales service cost caused by the damage. Further, since the driver's stepping liftability using the step 40 is satisfied, customer's productivity can be improved.

Meanwhile, FIG. 9 illustrates an inclined type swing step 1 mounted on a truck 100. As illustrated, the truck 100 is provided with the inclined type swing step 1 between the extension region of the garnish 120 surrounding an upper side of the wheel 110 from the lower side of the cabin 140 and the extension region of the bumper 130.

In particular, the inclined type swing step 1 is an inclined type swing step, in which the step swing device 10 is composed of the swing supporter 20 including a pair of first and second swing supporters 20-1 and 20-2, and the swing arm 30 including a pair of first and second swing arms 30-1 and 30-2. First and second hinge bosses 41-1 and 41-2 are formed by fastening the hinge pin 34 to the step 40, one side of which is inclined due to the difference in inclination angle between the first and second swing arms 30-1 and 30-2, and the step bracket 50 is composed of the mounting bracket 50-1 and the side cover bracket 50-2 for mounting the swing step 1 on the truck 100 through the fixed flange 55.

Accordingly, the inclined type swing step 1 is composed of the same constituent elements as those described through FIGS. 1 to 7, and the step 40 forms the one-side inclination state as described above through FIG. 8 in a state where the swing step 1 is mounted on the truck 100, and thus the step 40 is positioned inside the approach angle line with respect to the ground from the front side of the wheel 110.

Figure 10:
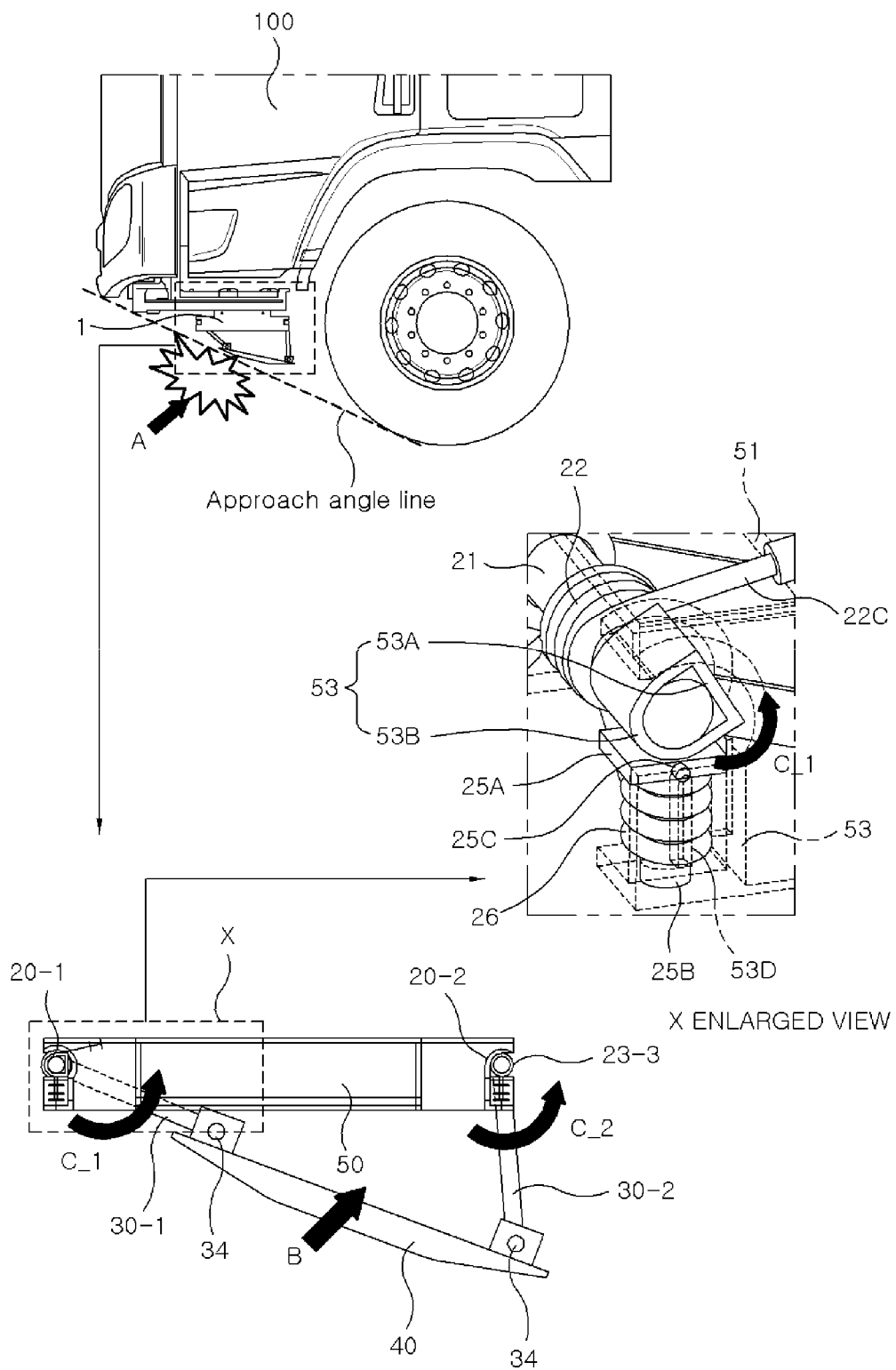
FIG. 10 illustrates a state in which an inclined type swing step mounted on a truck according to the present disclosure receives an external impact and a step swing device is operated.
Figure 11:
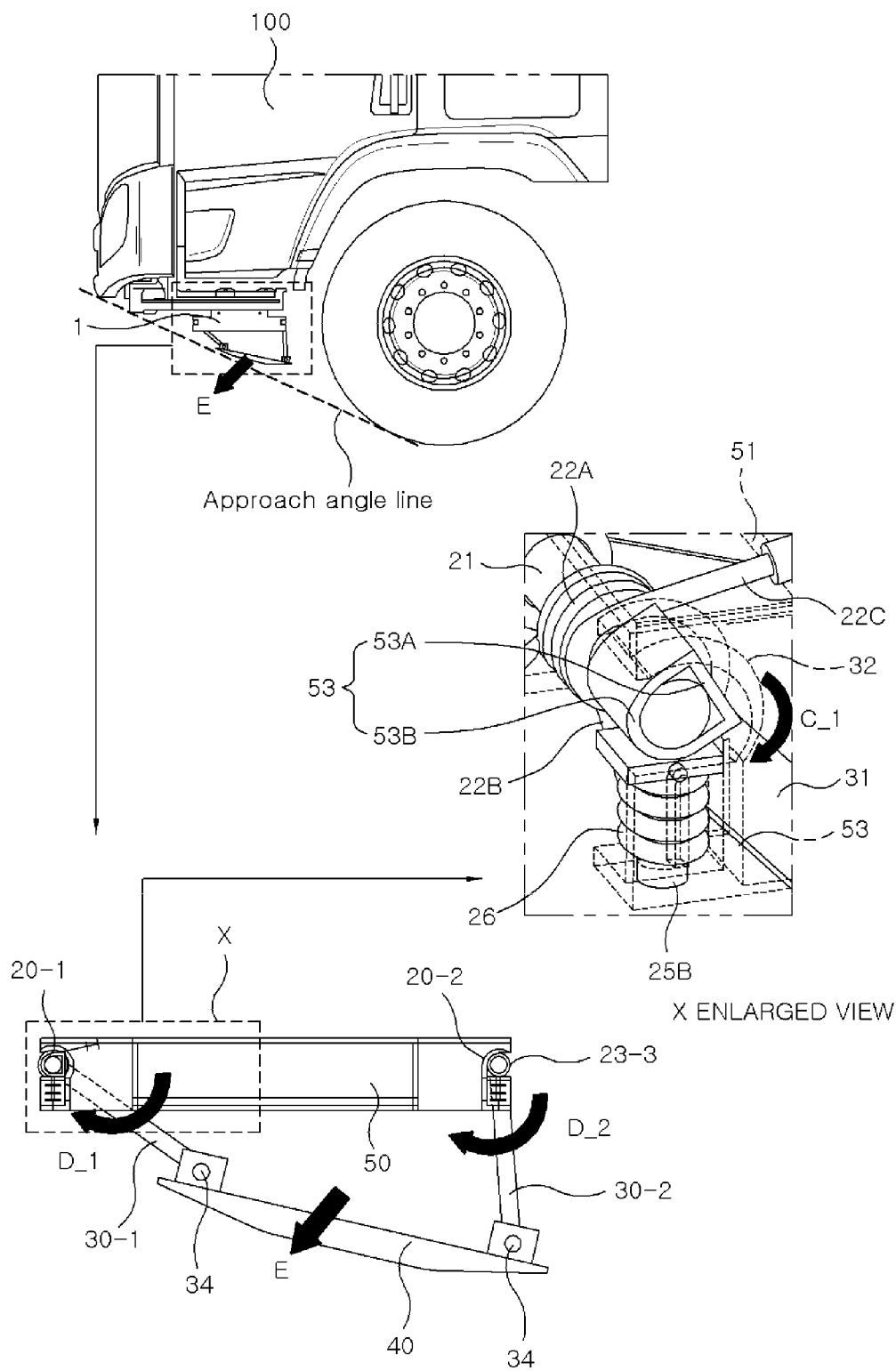
FIG. 11 illustrates an operation state in which a step swing device according to the present disclosure returns to an initial state after impact absorption.

Meanwhile, FIGS. 10 and 11 illustrate an operation state in which the inclined type swing step 1 mounted on the truck 100 returns to the initial state after absorbing the external impact.

In case that the external object impact A is applied to the step 40 during driving of the truck 100 of FIG. 10, the step 40 receives an upward push movement force B caused by the external object impact A, and moves upward.

Then, the first swing arm 30-1 applies a counterclockwise torque C_1 to the hinge shaft 21 combined through the half boss 32 as a region on the side of the hinge pin 34 combined through the hollow boss 33 moves upward together with the step 40, and thus the hinge shaft 21 of the first swing supporter 20-1 is rotated.

Finally, the rotation of the hinge shaft 21 forms the counterclockwise rotation of the first and second stopper bushes 23-1 and 23-2, and the counterclockwise rotation does not proceed any more since the straight surface 23B of the "D" shape of the first and second stopper bushes 23-1 and 23-2 gets caught on the upper side region of the wall surface of the shaft position part 53A of the hinge guide 53.

In this process, the press shaft 25 and the press shaft spring 26 are not moved or deformed, since the hinge shaft spring 22 buffers the upward movement of the first swing arm 30-1 by the spring elasticity. That is, the bottom contact part 22B of the hinge shaft spring 22 is deformed as much as the upward movement amount of the first swing arm 30-1 going upward, and thus generates a downward hinge shaft spring restoring force.

Further, since the region on the side of the hinge pin 34 combined with the second swing arm 30-2 through the hollow boss 33 receives an upward pushing force together with the step 40, the second swing arm 30-2 applies a relatively weak counterclockwise rotating force C_2 to the hinge shaft 21 combined through the half boss 32, and the counterclockwise rotating force C_2 makes the first and second rotating bushes 23-3 and 23-4 be somewhat rotated. As described above, since the first and second rotating bushes 23-3 and 23-4 are somewhat rotated even if they are relatively incomplete, the step 40 can make an upward movement without being resisted by the second swing arm 30-2.

In contrast, in case that the external object impact A applied to the step 40 is removed, the hinge shaft spring 22 produces a downward hinge shaft spring restoring force through the bottom contact part 22B in order to return to the initial state since the external object impact A has disappeared, and the downward hinge shaft spring restoring force is applied to the first swing arm 30-1.

Then, since the first swing arm 30-1 goes downward by the downward hinge shaft spring restoring force of the shaft spring 22, a clockwise rotating force D_1 is applied to the hinge shaft 210 combined through the half boss 32, and the hinge shaft 21 of the first swing supporter 20-1 is rotated by the clockwise rotating force D_1.

Finally, the rotation of the hinge shaft 21 forms the clockwise rotation of the first and second stopper bushes 23-1 and 23-2, and the clockwise rotation does not proceed any more since the straight surface 23B of the "D" shape of the first and second stopper bushes 23-1 and 23-2 gets caught on the lower side region of the wall surface of the shaft position part 53A of the hinge guide 53.

As a result, the first swing arm 30-1 applies a downward movement force E to the step 40 through the region on the side of the hinge pin 34 combined through the hollow boss 33, and the step 40 goes downward by the downward movement force, and returns to the initial position.

In this case, since the region on the side of the hinge pin 34 combined with the second swing arm 30-2 through the hollow boss 33 receives a downward force together with the step 40, the second swing arm 30-2 applies a relatively weak clockwise rotating force D_2 to the hinge shaft 21 combined through the half boss 32, and the clockwise rotating force D_2 makes the first and second rotating bushes 23-3 and 23-4 be somewhat rotated. As described above, since the first and second rotating bushes 23-3 and 23-4 are somewhat rotated even if they are relatively incomplete, the step 40 can make a downward movement without being resisted by the second swing arm 30-2.

Further, the press shaft 25 and the press shaft spring 26 are not moved or deformed.

Meanwhile, FIGS. 12 to 15 illustrate an operation state of a swing step 1 during the driver's stepping.

Figure 12:
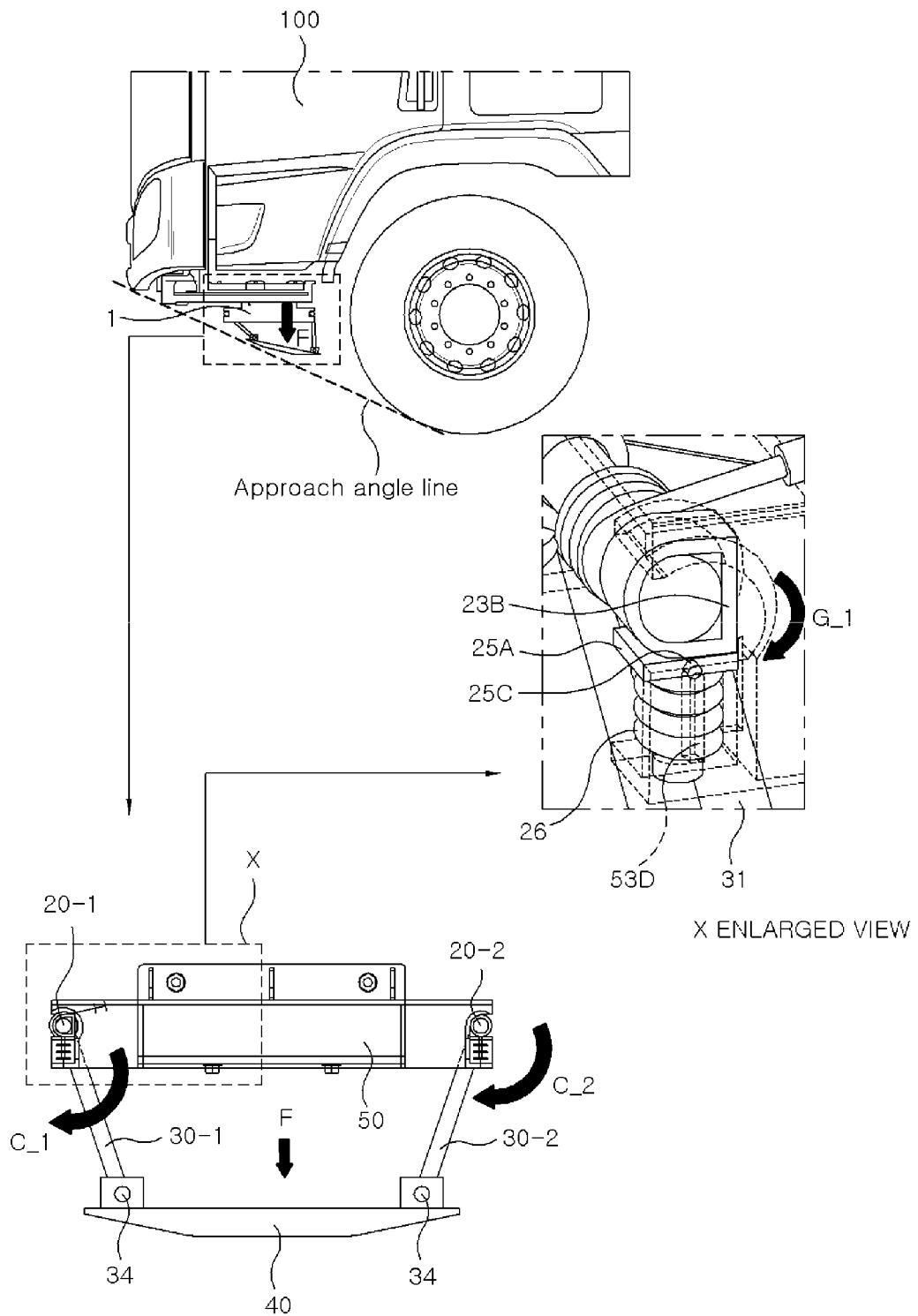
FIG. 12 illustrates a state in which a step swing device is operated by a stepping force applied to a step during driver's stepping in a truck according to the present disclosure.

Referring to FIG. 12, the step 40 goes downward by a driver's stepping force F applied downwardly.

Then, the first hinge boss 41-1 of the step 40 pulls the first swing arm 30-1 downward through the hinge pin 34 combined through the hollow boss 33, and applies a clockwise rotating force $G\_1$ to the first and second stopper bushes 23-1 and 23-2 through the hinge shaft 21 combined through the half boss 32. At the same time, the second hinge boss 41-2 of the step 40 pulls the second swing arm 30-2 downward through the hinge pin 34 combined through the hollow boss 33, and applies a clockwise rotating force $G\_2$ to the first and second rotating bushes 23-3 and 23-4 through the hinge shaft 21 combined through the half boss 32.

Through this, the straight surface 23B of the "D" shape of the first and second stopper bushes 23-1 and 23-2 erects vertically to face the shaft position part 53A of the hinge guide 53 by the clockwise rotating force $G\_1$, and the first and second stopper bushes 23-1 and 23-2 are shifted to a state where the first and second stopper bushes 23-1 and 23-2 are able to go downward as pressing the press shaft 25.

Accordingly, the step goes downward, and the interval between the step 40 and the step bracket 50 is widened.

Figure 13:
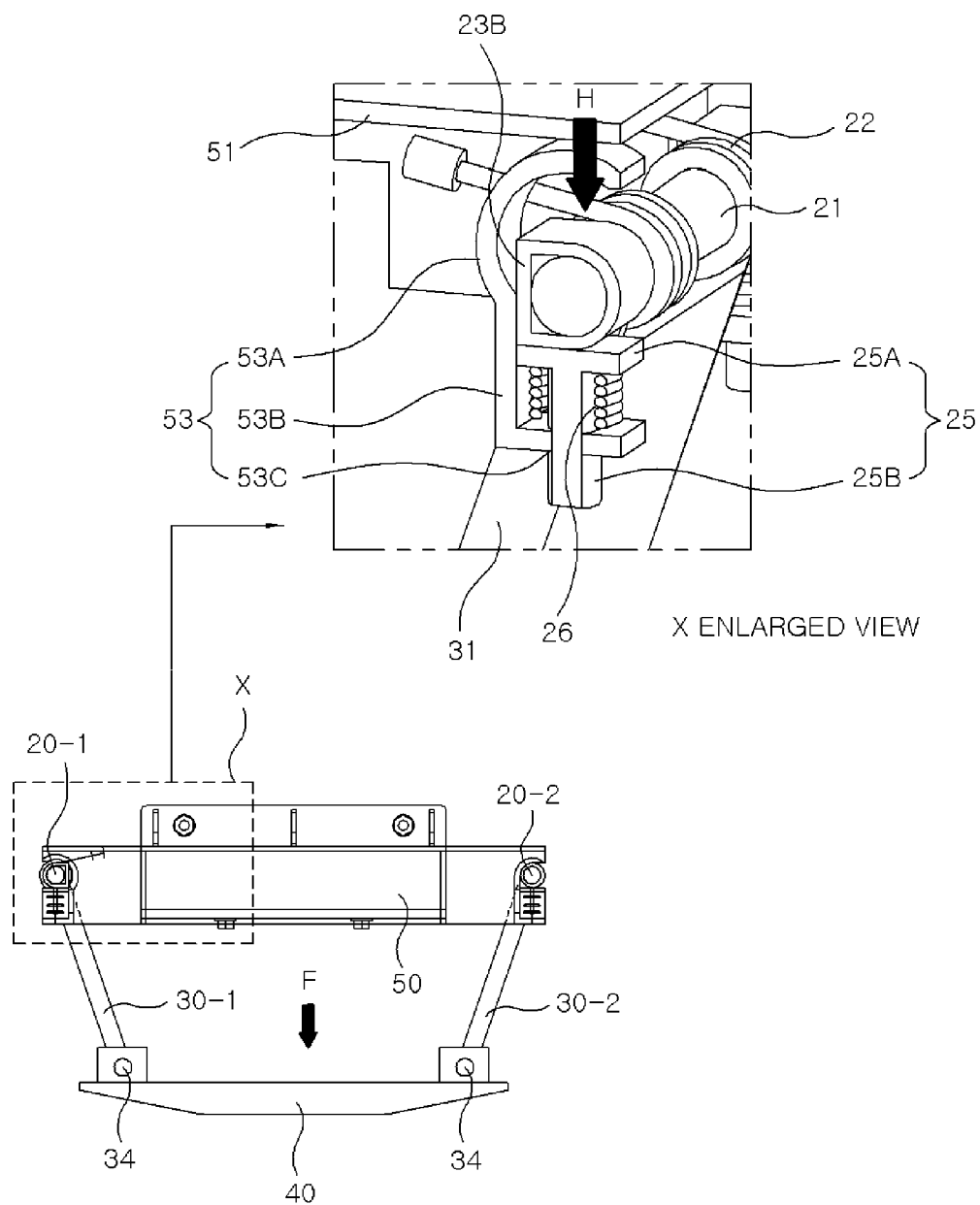
FIG. 13 illustrates a state after a step swing device is operated during driver's stepping using a step according to the present disclosure.

Then, referring to FIG. 13, since the step 40 goes downward through a continuous driver's stepping force F, a downward pressing force H is applied to the first and second swing arm 30-1 and 30-2, and the downward pressing force H causes the first and second stopper bushes 23-1 and 23-2 to go downward. In this case, the first and second rotating bushes 23-3 and 23-4 also go downward by the downward pressing force H.

Then, in a state where the press shaft 25 comes in contact with the first and second stopper bushes 23-1 and 23-2 through the press plate 25A, the side of the extension rod 25B goes downward through the hole 53C formed on the bottom surface of the spring deformation space part 53B of the hinge guide 53, and the projection pin 25C (refer to FIG. 2) projects from the side surface of the press plate 25A, and moves along the slot 53D (refer to FIG. 2) formed on the spring deformation space part 53B of the hinge guide 53. In this case, the press shaft 25 provided on the side of the first and second rotating bushes 23-3 and 23-4 also moves in the same manner.

Through this, the press shaft spring 26 is compressed and deformed as much as the downward movement amount of the press shaft 25. Also, the bottom contact part 22B of the hinge shaft spring 22 is deformed as much as the downward movement amount of the first swing arm 30-1 that goes downward to produce the upward hinge shaft spring restoring force.

As a result, the straight surface 23B of the "D" shape of the first and second stopper bushes 23-1 and 23-2 gets out of the shaft position part 53A of the hinge guide 53 and is positioned on the side wall surface of the spring deformation space part 53B, and thus the counterclockwise rotation thereof, which is opposite to the clockwise rotation, is prevented, and such a restriction of the counterclockwise rotation blocks the movements of the first and second swing arms 30-1 and 30-2 and the step 40 to return to their initial states.

Figure 14:
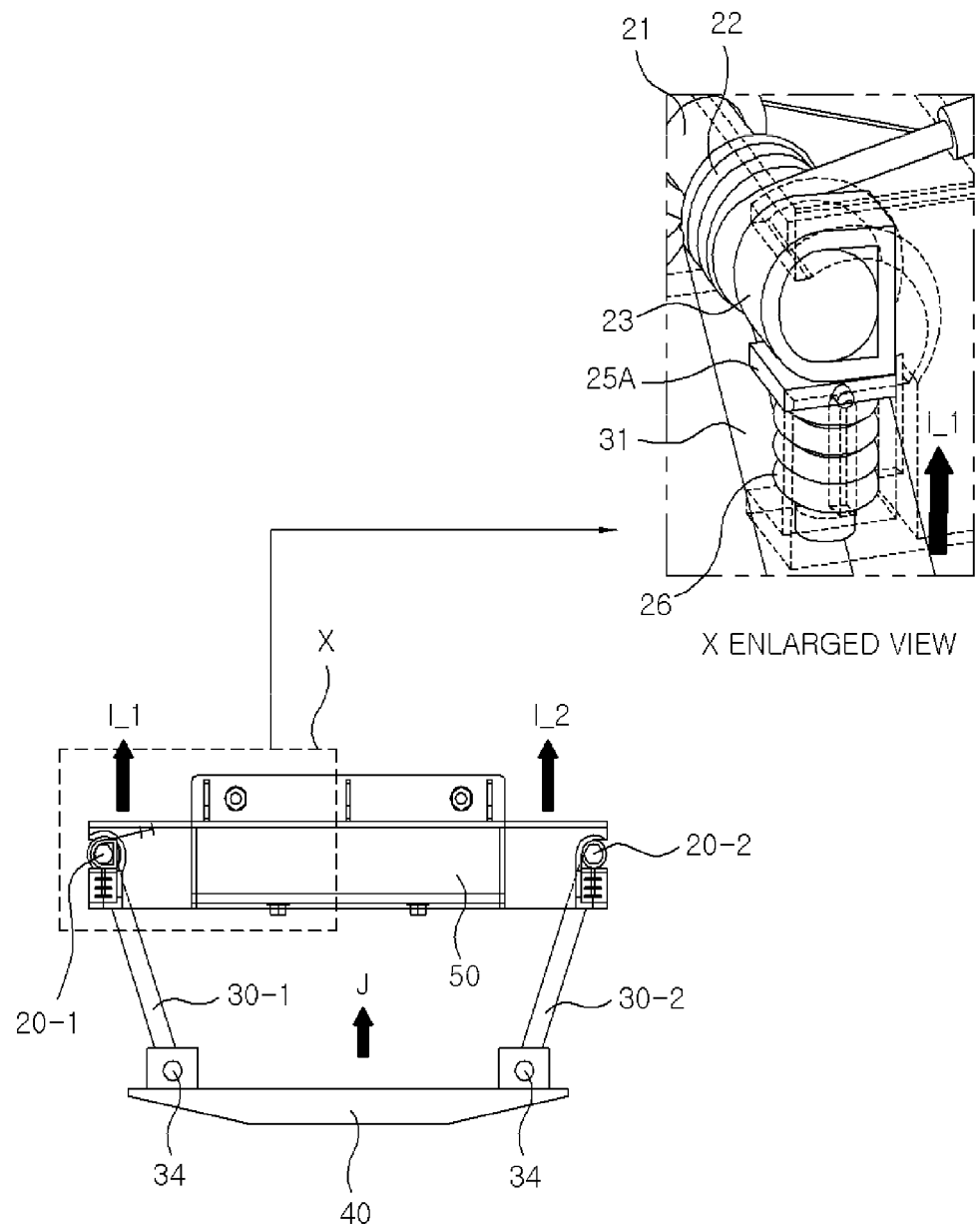
FIG. 14 illustrates a state in which a step swing device performs a return operation when a stepping force of a step according to the present disclosure is released.

In contrast, referring to FIG. 14, the step 40 receives a step return force J to make the step go upward, and the step return force J is produced through the spring restoring force $I\_1$ of the press shaft spring 26.

That is, the spring restoring force $I\_1$ of the press shaft spring 26 pushes the press plate 25A of the press shaft 25 upward through the removal of the driver's stepping force F, and the press plate 25A pushes the first and second stopper bushes 23-1 and 23-2 upward, so that the straight surface 23B of the "D" shape of the first and second stopper bushes 23-1 and 23-2 gets out of the spring deformation space part 53B of the hinge guide 53, and moves its position in a state where the straight surface 23B erects vertically to face the shaft position part 53A. In this case, the press shaft 25 provided on the side of the first and second rotating bushes 23-3 and 23-4 moves in the same manner.

Figure 15:
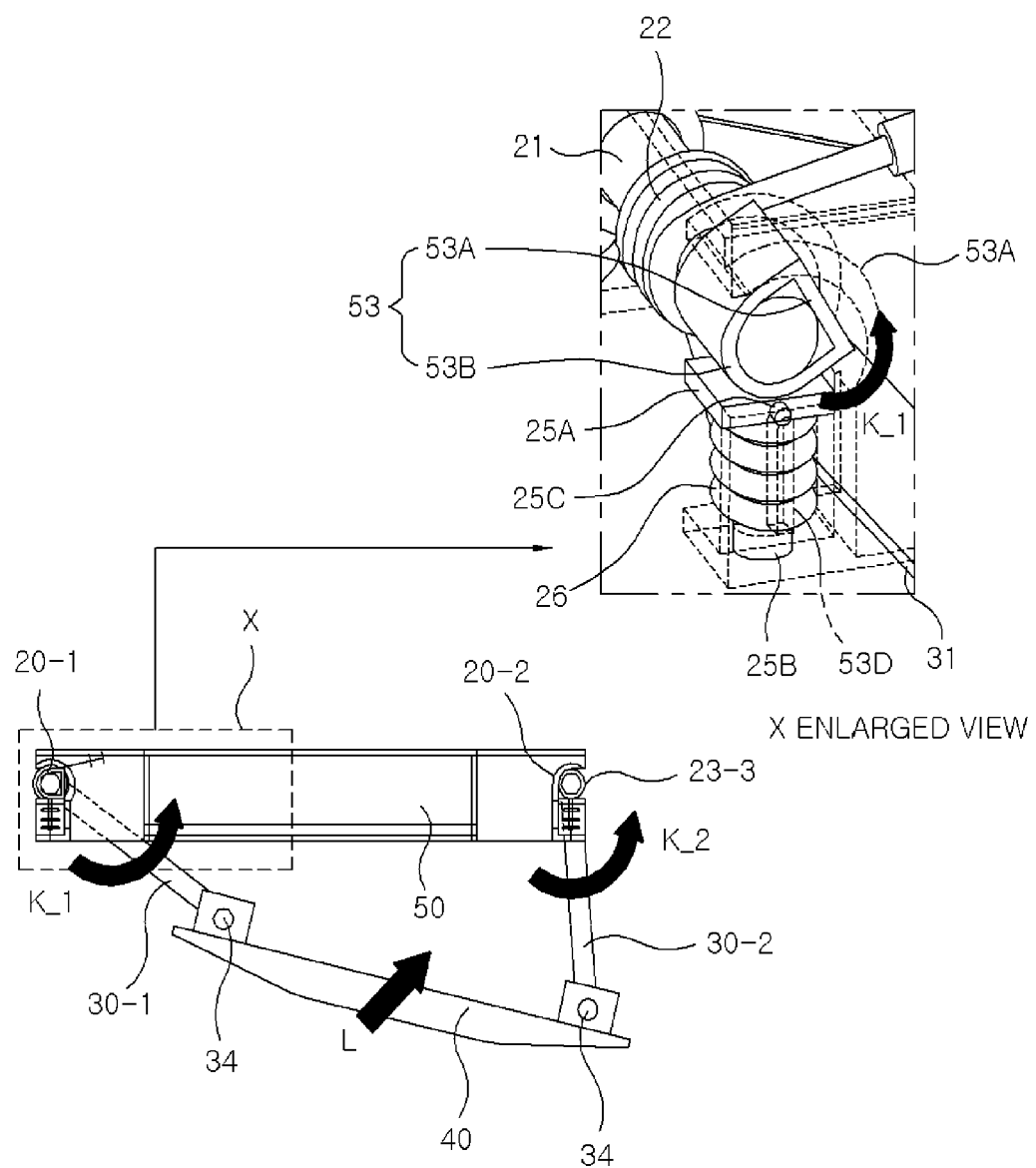
FIG. 15 illustrates a state in which a step returns to an initial shape to have inclination after a return operation of a step swing device according to the present disclosure.

Then, referring to FIG. 15, the step 40 receives a step return holding force L to return to the initial position, and the step return holding force L is produced through a counterclockwise rotating force $K\_1$ by the upward hinge shaft spring restoring force generated by the bottom contact part 22B of the hinge shaft spring 22.

That is, the downward hinge shaft spring restoring force, which the hinge shaft spring 22 applies, is applied to the first swing arm 30-1, and thus the first swing arm 30-1 applies a counterclockwise torque $K\_1$ to the hinge shaft 21 combined through the half boss 32, and the hinge shaft 21 of the first swing supporter 20-1 is rotated by the counterclockwise torque $K\_1$.

Finally, the rotation of the hinge shaft 21 forms the counterclockwise rotation of the first and second stopper bushes 23-1 and 23-2, and the counterclockwise rotation does not proceed any more since the straight surface 23B of the "D" shape of the first and second stopper bushes 23-1 and 23-2 gets caught on the upper side region of the wall surface of the shaft position part 53A of the hinge guide 53.

As a result, the first swing arm 30-1 applies the step return holding force L to the step 40 through the region on the side of the hinge pin 34 combined through the hollow boss 33, and the step 40 goes upward by the step return holding force L to return to the initial position.

In this case, since the region on the side of the hinge pin 34 combined with the second swing arm 30-2 through the hollow boss 33 receives an upward force together with the step 40, the second swing arm 30-2 applies a relatively weak counterclockwise rotating force $K\_2$ to the hinge shaft 21 combined through the half boss 32, and the counterclockwise rotating force $K\_2$ makes the first and second rotating bushes 23-3 and 23-4 be somewhat rotated. As described above, since the first and second rotating bushes 23-3 and 23-4 are somewhat rotated even if they are relatively incomplete, the step 40 can make an upward movement without being resisted by the second swing arm 30-2.

As described above, the inclined type swing step 1 applied to the truck 100 according to the present embodiment the present disclosure includes the step bracket 50 mounted on the lower region of the cabin providing the driver's seat, the step 40 for the foothold, and the step swing device 10 including the hinge shaft spring 22 and/or the press shaft spring 26, positioning the step 40 inside the virtual approach angle line formed with respect to the ground from the front side of the wheel 120 through the one-side inclination in a state where the step is spaced apart from the step bracket 50, and generating the spring elasticity acting to make the step 40 return to the initial position after the downward movement of the step 40.

Accordingly, through the application of the inclined type swing step 1, the truck 100 can hold the shaking of the step 40 due to the driver's stepping by the swing structure using the spring and the hinge, can improve the vehicle accessibility through the prevention of the interference by the step 40 during the driving on the bound and inclined road, and can absorb the external object impact exceeding the approach angle by selective rotations of the step swing device 10 by situations.

While the present disclosure has been described with respect to the specific embodiments, it will be apparent to those skilled in the art that various changes and modifications may be made without departing from the spirit and scope of the disclosure as defined in the following claims.

The invention claimed is:

1. A swing step comprising:
 a swing supporter connected to a step bracket positioned above a step that forms a foothold; and
 a swing arm connecting the swing supporter to the step where the step is inclined to one-side inclination as an initial position relative to the step bracket;
 wherein the swing supporter includes a first swing supporter having a hinge guide formed on one side of the step bracket, and a second swing supporter having a hinge guide formed on an other side of the step bracket; and
 wherein the hinge guide forms a space in which the first swing supporter and the second swing supporter move upward and downward.

2. The swing step according to claim 1, wherein the swing arm includes a first swing arm connected to the first swing supporter and a second swing arm connected to the second swing supporter; and
 the first swing arm forms the one-side inclination so that the step is inclined by lifting up the step higher than the second swing arm.

3. The swing step according to claim 1, wherein the first swing supporter includes a hinge shaft connected to the first swing arm as a center of rotation, and the hinge shaft including a shaft part having a first stopper bush connected to one side of the shaft part and a second stopper bush connected to an other side of the shaft part when the hinge shaft is positioned on the hinge guide; and
 the first stopper bush and the second stopper bush form the one-side inclination on the step by limiting rotation of the hinge shaft within a limited rotating angle region.

4. The swing step according to claim 3, wherein each of the first stopper bush and the second stopper bush forms a limited rotating angle region in a "D" cross-sectional shape that contacts an inner wall surface of the hinge guide.

5. The swing step according to claim 3, wherein the first swing supporter further comprises:
 a hinge shaft spring generating spring elasticity through rotation of the first swing arm when the hinge shaft spring surrounds the hinge shaft;
 a press shaft contacting the first stopper bush and the second stopper bush, and moving downward together with the hinge shaft; and
 a press shaft spring generating spring elasticity through compression by downward movement of the press shaft.

6. The swing step according to claim 5, wherein in an initial state of the step inclined to the one-side inclination, the spring elasticity of the hinge shaft spring is applied to the first swing arm.

7. The swing step according to claim 5, wherein the spring elasticity of the press shaft spring is generated by a compression spring, and the spring elasticity pushes the press shaft upward and makes the hinge shaft return to an initial position.

8. The swing step according to claim 1, wherein the second swing supporter comprises:
 a hinge shaft connected to the second swing arm to form a center of rotation when the hinge shaft is positioned on the hinge guide, the hinge shaft including a shaft part;
 a first rotating bush connected to one side of the shaft part and a second rotating bush connected to an other side of a shaft part;
 a press shaft contacting the first rotating bush and the second rotating bush, and moving downward together with the hinge shaft; and
 a press shaft spring generating spring elasticity through compression by downward movement of the press shaft.

9. The swing step according to claim 8, wherein each of the first rotating bush and the second rotation is in an "O" cross-sectional shape, and is rotated in an inner space of the hinge guide.

10. The swing step according to claim 8, wherein the spring elasticity of the press shaft spring is generated by a compression spring, and the spring elasticity pushes the press shaft upward to return the hinge shaft to an initial position.

11. The swing step according to claim 1, wherein each of a first swing arm and a second swing arm forms a driver's stepping space of the step and the step bracket in an inverse trapezoid shape when the step goes downward.

12. The swing step according to claim 1, wherein the step is connected to a first swing arm by a first hinge boss formed on one side, and is connected to a second swing arm by a second hinge boss formed on an other side; and
 the first hinge boss and the first swing arm, and the second hinge boss and the second swing arm are respectively connected to each other via hinge pins.

13. The swing step according to claim 1, wherein the hinge guide is formed at a square corner of the step bracket.

14. A truck comprising:
 an inclined swing step comprising:
  a step bracket;
   a step spaced apart from the step bracket and forming a driver's stepping space;
   a swing supporter connected to the step bracket; and
   a swing arm connecting the swing supporter to the step where the step is inclined to one-side inclination as an initial position relative to the step bracket; and
 a cabin having a driver's seat and forming a lower region on which the step bracket is mounted so that the step is positioned inside an approach angle line formed with respect to a ground from a front side of a wheel to the one-side inclination;
 wherein the step bracket includes a mounting bracket having a hinge guide with which the swing supporter is connected, a fixed flange fastened to the lower region of the cabin, and a side cover bracket connected to the mounting bracket and covering the hinge guide.

15. The truck according to claim 14, wherein the hinge guide forms a space in which the swing supporter moves upward or downward so that movement of the swing arm interlocks with the upward or downward movement of the step.

16. The truck according to claim 14, wherein the lower region of the cabin is a garnish extension region surrounding an upper side of the wheel.

17. The truck according to claim 14, wherein the lower region of the cabin is a bumper extension region.

\* \* \* \* \*